(12) United States Patent
Makiyama et al.

(10) Patent No.: US 7,437,576 B2
(45) Date of Patent: Oct. 14, 2008

(54) POWER MANAGEMENT APPARATUS AND METHOD FOR MANAGING THE QUANTITY OF POWER THAT IS CONSUMED BY A COMPUTER GROUP INCLUDING A PLURALITY OF COMPUTERS INTERCONNECTED BY A NETWORK

(75) Inventors: Fumihiro Makiyama, Tokyo (JP); Toshikazu Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 489 days.

(21) Appl. No.: 11/153,314

(22) Filed: Jun. 16, 2005

(65) Prior Publication Data

US 2005/0289371 A1    Dec. 29, 2005

(30) Foreign Application Priority Data

Jun. 25, 2004    (JP)    ............................ 2004-187696

(51) Int. Cl.
*G06F 1/00*    (2006.01)
*G06F 1/32*    (2006.01)
(52) U.S. Cl. ...................... 713/300; 713/320; 713/323
(58) Field of Classification Search ................ 713/300, 713/320, 323, 340
See application file for complete search history.

(56) References Cited

U.S. PATENT DOCUMENTS

| 5,799,198 | A | * | 8/1998 | Fung | ........................... 713/323 |
| 6,526,516 | B1 | * | 2/2003 | Ishikawa et al. | ............ 713/340 |
| 7,210,048 | B2 | * | 4/2007 | Bodas | ........................ 713/320 |
| 2003/0005339 | A1 | * | 1/2003 | Cohen et al. | ................. 713/300 |
| 2004/0163001 | A1 | * | 8/2004 | Bodas | ........................ 713/300 |

FOREIGN PATENT DOCUMENTS

| JP | 4-100134 | 4/1992 |
| JP | 2003-122459 | 4/2003 |

* cited by examiner

*Primary Examiner*—Suresh K Suryawanshi
(74) *Attorney, Agent, or Firm*—McGinn IP Law Group, PLLC

(57) ABSTRACT

A plurality of computers interconnected by a network include a computer group and have individual management modules. Each of the management module includes a unit for obtaining the quantity of power consumed by the corresponding computer, and a unit for storing the maximum quantity of power that can be supplied to the computer group. The management master module of one of the computers activates a master power manager, and serves as a master management module. The master power manager obtains information concerning power consumption from the individual computers, and adjusts the total value of the power consumed by the computer group so as not to exceed the maximum quantity of power.

11 Claims, 11 Drawing Sheets

PRIORITY TABLE

| PRIORITY | HOST NAME | IP ADDRESS | OPERATING MODE INFORMATION ||||
|---|---|---|---|---|---|---|
| | | | OPERATING MODE | OPERATING SPEED | NUMBER OF TRANSACTIONS | MAXIMUM POWER CONSUMPTION |
| 1 | A | XXX.XXX.150.1 | A1 | 500MHz | 50000 | 200W |
| | | | A2 | 700MHz | 100000 | 400W |
| | | | A3 | 900MHz | 200000 | 600W |
| 2 | B | XXX.XXX.150.2 | B1 | 200MHz | 20000 | 180W |
| | | | B2 | 400MHz | 40000 | 360W |
| | | | B3 | 600MHz | 60000 | 540W |
| 3 | C | XXX.XXX.150.3 | C1 | 300MHz | 30000 | 180W |
| | | | C2 | 500MHz | 50000 | 360W |
| | | | C3 | 800MHz | 80000 | 540W |
| ... | ... | ... | ... | ... | ... | ... |

FIG. 4

POWER MANAGEMENT APPARATUS AND METHOD FOR MANAGING THE QUANTITY OF POWER THAT IS CONSUMED BY A COMPUTER GROUP INCLUDING A PLURALITY OF COMPUTERS INTERCONNECTED BY A NETWORK

BACKGROUND OF THE INVENTION

1. Field of the Invention

The present invention relates to a power management apparatus and a power management method, and a computer program product therefor, and relates particularly to a power management apparatus and a power management method, and a program therefor, for managing the total amount of power consumed by a computer group including a plurality of computers connected to a network.

2. Description of the Related Art

Recently, as transfer rates for the central processing units and the internal buses provided for computers interconnected by a network continue are increased, the number of transactions available for processing has increased sharply. Accordingly, there has been a proportional increase in the power required to perform the processing. Further, under conditions wherein only a limited quantity of power is available, throughput is reduced when the processing performed by central processing units is performed at rates that exceed a specific processing speed. This occurs when no mechanism is available for controlling the quantity of power required for the operation of the central processing unit of individual computers; and thus, when many transactions are to be handled by a specific computer, the main central processing unit of that computer cannot obtain the power required for its operation.

Furthermore, a computer can become inoperable when, due to an increase in the number of transactions handled, the amount of power consumed is excessive. This occurs because the quantity of the power supplied to each computer cannot be optimized, and excessive power may be consumed by a specific computer due to an increase in the number of transactions it executes.

A power management technique for a network computer, disclosed in Japanese Patent Laid-Open Publication No. Hei 04-100134, provides for the powering off of a computer when it is not currently in use, and thereby reduces operating costs. According to this technique, however, a computer that is not currently being employed is merely powered off, while the amount of power supplied to a computer that is currently being employed cannot be managed.

A technique, disclosed in Japanese Patent Laid-Open Publication No. 2003-122459, provides for the calculation of the total power consumption for a server system constituted by a plurality of sub-systems that include memories for storing information concerning power consumption. According to this system, power units connected to individual sub-systems supply power to the sub-systems. Server management cards connected to the individual servers extract the information concerning power consumption from the sub-systems, and based on the extracted information, calculate the total power consumed by the sub-systems. Since, however, this system employs the server management cards to calculate the total power consumption, a plurality of computers interconnected by a network can not manage power autonomously.

SUMMARY OF THE INVENTION

In view of the foregoing and other exemplary problems, drawbacks, and disadvantages, it is an exemplary feature of the present invention to autonomously and appropriately adjust the quantity of power to be supplied to individual computers interconnected by a network, under a condition wherein only a limited quantity of power is supplied to each of the computers.

According to an example of the present invention, a power management apparatus, for managing the quantity of power that is consumed by a computer group including a plurality of computers interconnected by a network, includes:

controllers, provided for the computers, for respectively obtaining the quantity of power consumed by each of the computers;

storage units, provided for the computers for storing the maximum quantity of power to be supplied to the computer group; and an overall controller for obtaining, from the controllers of the computers, the quantities of power consumed by the computers and for adjusting power consumption so that the total value of the power consumed by the computer group is not greater than the maximum quantity of power, wherein the overall controller is activated by only one computer in the computer group.

According to another example for the present invention, a power management method, for managing the quantity of power that is consumed by a computer group constituted by a plurality of computers interconnected by a network, includes:

obtaining the respective quantity of power consumed by each of the computers;

storing the maximum quantity of power to be supplied to the computer group; and obtaining the quantities of the power consumed by the computers and providing overall control for the power consumption, so that the total value of the quantity of power consumed by the computer group is not greater than the maximum quantity of power, whereby the overall control means is activated by only one computer in the computer group.

According to an additional example for the present invention, a computer program product permits a computer to function as:

a controller, provided for a plurality of computers that are interconnected by a network, thereby constituting a computer group, for obtaining the respective quantity of power consumed by each of the computers;

storage units, which are provided for the computers and which can store the maximum quantity of power to be supplied to the computer group;

an overall controller, for obtaining the quantities of power consumed by the computers from the controllers of the computers and for controlling power consumption so that the total value of the quantity of power consumed by the computer group is not greater than the maximum quantity of power; and a unit for permitting only one computer in the computer group to activate the overall controller.

According, to the present invention, it is possible to autonomously and appropriately adjust the quantity of power to be supplied to individual computers interconnected by a network, under a condition wherein only a limited quantity of power is supplied to each of the computers.

BRIEF DESCRIPTION OF THE DRAWINGS

The above and other exemplary purposes, features and advantages of the present invention will become apparent during the course of the following detailed description, given while taking into consideration the accompanying drawings in which:

FIG. 4 is a diagram showing an example priority table according to the present invention;

DETAILED DESCRIPTION OF THE EXEMPLARY EMBODIMENT

Figure 1:
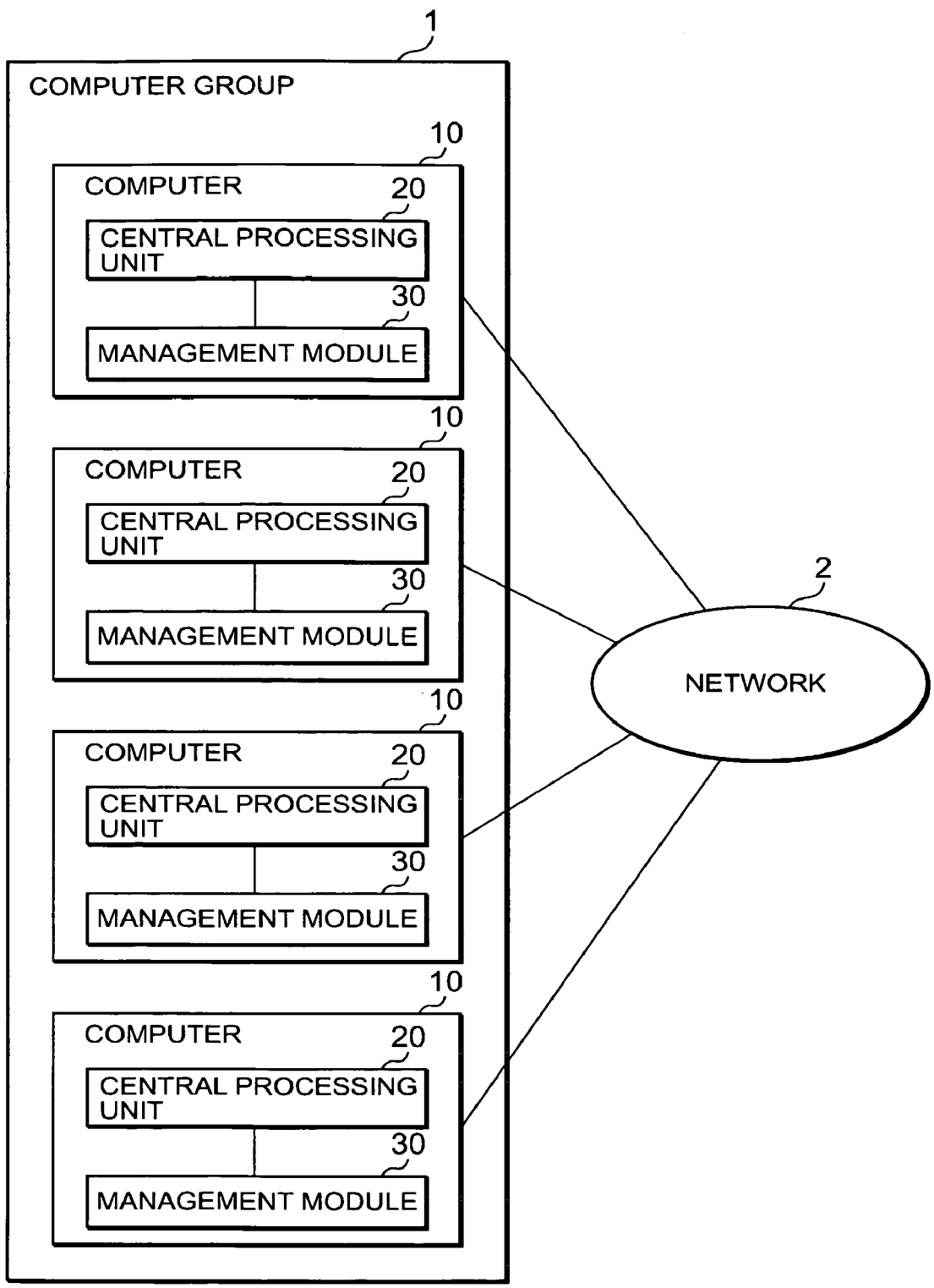
FIG. 1 is a block diagram showing the general configuration of an exemplary power management apparatus according to the present invention.

FIG. 1 is a block diagram showing the general configuration of a power management apparatus according to the present invention. The power management apparatus of this invention comprises a computer group 1 and a network 2, and the computer group 1 includes a plurality of computers 10 interconnected by the network 2. Each of the computers 10 includes a central processing unit 20 and a management module 30 that manages the power for the computer 10. In FIG. 1, the DC power sources of all the computers 10 are off. When the DC power source for one of the computers 10 is turned on, the management module 30 of the pertinent computer 10 serves as a master management module 30a, and optimizes the power consumed by the entire computer group 1. Operation of the management modules 30 can by effected only by supplying them with AC power.

Figure 2:
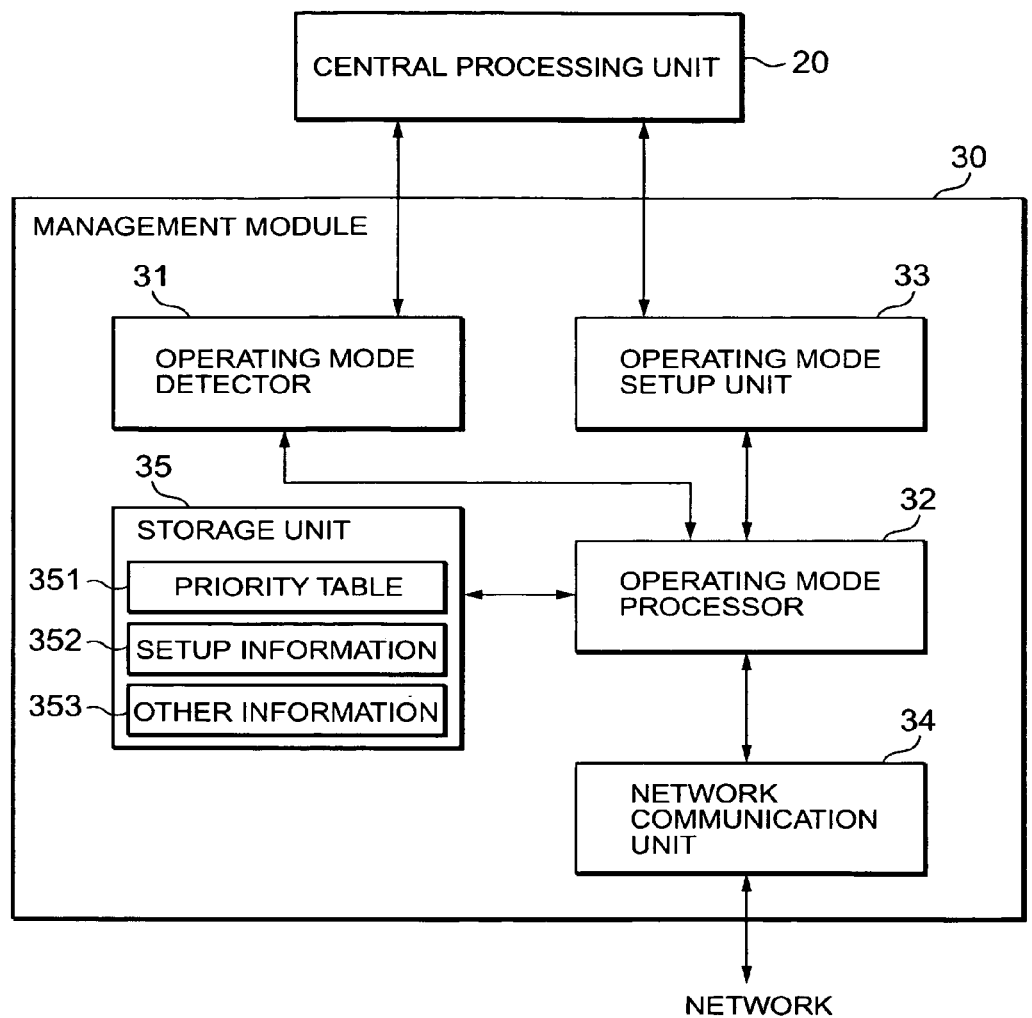
FIG. 2 is a block diagram showing the arrangement of a management module according to the present invention.

FIG. 2 is a block diagram showing the arrangement of a management module 30. The management module 30 includes an operating mode detector 31, an operating mode processor 32, an operating mode setup unit 33, a network communication unit 34, and a storage unit 35.

Figure 3:
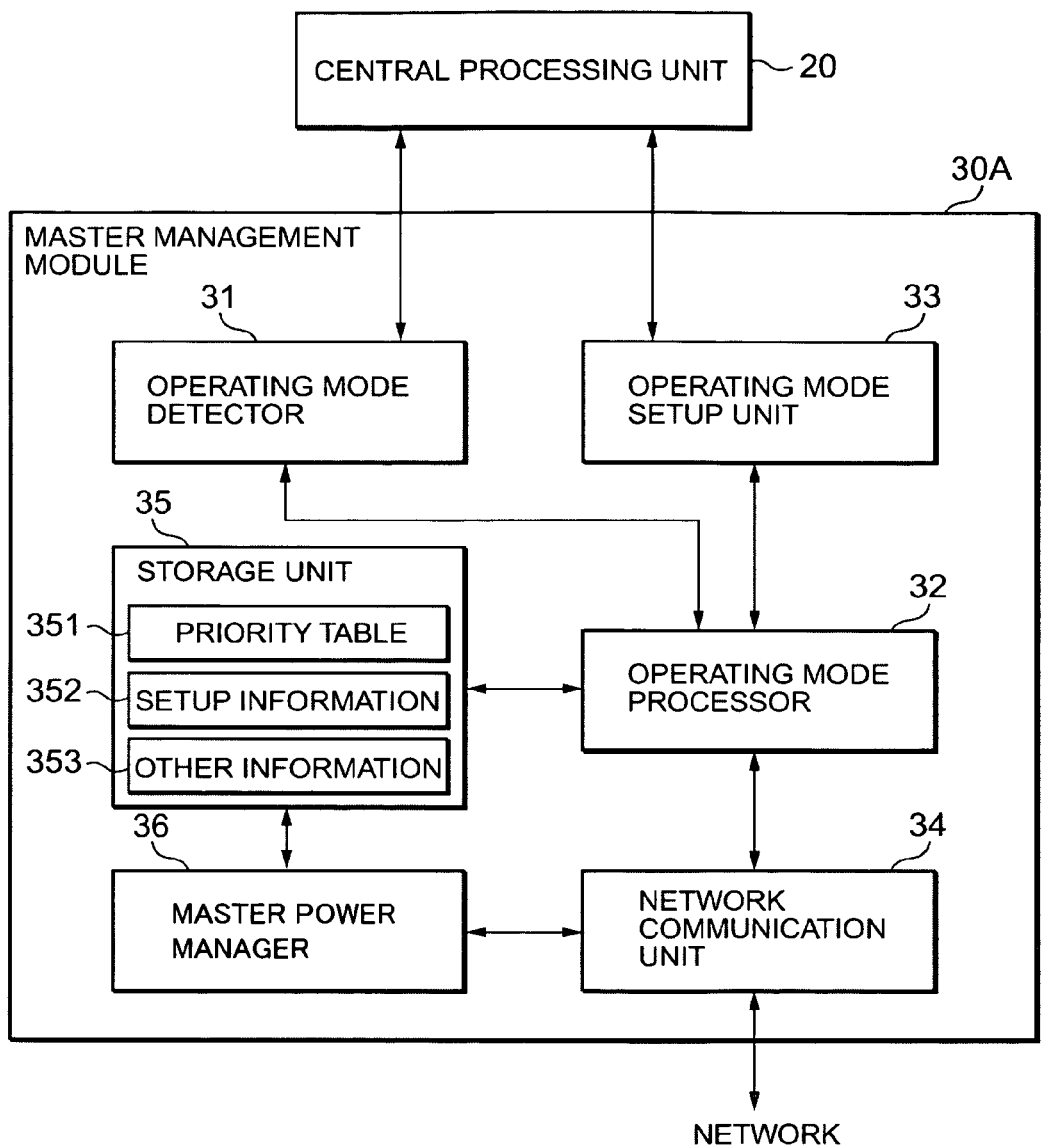
FIG. 3 is a block diagram showing the arrangement of a master management module according to the present invention.

FIG. 3 is a block diagram showing the arrangement of a master management module 30a. In addition to the arrangement of the management module 30, the master management module 30a includes a master power manager 36.

The network communication unit 34 controls communication, via the network 2, with the management module 30 or the master management module 30a of another computer 10.

The storage unit 35 is, for example, a read only memory, a random access memory or a magnetic disk device, while stored in the storage unit 35 are a priority table 351, setup information 352 and other information 353.

The priority table 351 is a table wherein, for the supply of power, the priorities of the computers 10 are entered. FIG. 4 is a diagram showing an example for the priority table 351. Entered in the priority table 35 are the priority, the host name and the IP address of, and the operating mode information for, each computer 10 belonging to the computer group 1. The operating mode information includes the operating speed, the number of transactions (maximum value) and the maximum quantity of the power consumed during each available operating mode.

The setup information 352 indicates the operating mode currently set for each computer 10 belonging to the computer group 1.

The other information 353 includes the maximum quantity of the power to be supplied to the computer group 1, the number of computers 10 included in the computer group 1, the orders to be issued to start the respective computers 10, and the host name and the IP address of the computer 10 wherein the master management module 30a has been activated.

The operating mode detector 31 detects the ON state of a DC power source device that supplies the DC power required for the operation of the central processing unit 20 of the computer 10, and issues a notification to the operating mode processor 32. When the computer 10 is activated, the operating mode detector 31 obtains the latest power consumption and the latest operating mode from the central processing unit 20 for each predetermined period of time, and to update the setup information 352, stores these data in the storage unit 35.

The operating mode processor 32 receives, from the operating mode detector 31, a notification indicating that the DC power source of the computer 10 is on, and generates and broadcasts, via the network communication unit 34, a start packet that includes information for the quantity of power required to power on the computer 10. Further, the operating mode processor 32 receives a reply to the start packet from the master management module 30a, via the network communication unit 34, and stores the reply data in the storage unit 35. The reply data include the order in which the respective computer 10 in the computer group 1 was activated.

When a reply to the start packet is not received within a predetermined period of time, the operating mode processor 32 activates the master power manager 36. When the master power manager 36 is activated, the management module 30 serves as the master management module 30a, which includes not only the normal function but also a function for managing the management modules 30 of the individual computers 10.

The operating mode processor 32 generates an operating mode change packet to request a change to an operating mode that requires a large power consumption, and transmits this packet, via the network communication unit 34, to the master management module 30a. When a reply to the operating mode change packet indicates the change is permitted, the operating mode processor 32 requests that the operating mode setup unit 33 change the operating mode. When a reply to the operating mode change indicates that the change is inhibited, a predetermined period of time later the operating mode processor 32 re-transmits, via the network communication unit 34, an operating mode change packet to the master management module 30a.

When the operating mode processor 32 receives from the operating mode setup unit 33 a notification indicating that a request has been issued to the central processing unit 20 to shift to an operating mode that requires a small power consumption, the operating mode processor 32 transmits to the master management module 30a, via the network communication unit 34, a notification packet indicating that the shift to the operating mode requiring a small power consumption has been completed.

The operating mode processor 32 receives an existence packet from the master management module 30a for each predetermined time, and to update data, stores the unit count information and the setup information included in the existence packet in the storage unit 35. The unit count information indicates the number of currently operated computers 10 that belong to the computer group 1. When an existence packet is not received within a predetermined period of time, the operating mode processor 32 assumes that operation of the master-management module 30a has been disabled. At this time, the operating mode processor 32 examines the order information (the order in which the DC power source for the corresponding computer 10 is turned on). When in the order information the corresponding computer 10 is listed second, the pertinent operating mode processor 32 activates the master power manager 36. Through this processing, the pertinent management module 30 is designated and serves as the master management module 30a, succeeding to the management of the process for optimizing the quantity of power supplied to the computer group 1. In this case, the operating mode processor 32 broadcasts, via the network communication unit 34, a master change notification packet indicating that the master management module 30a has been changed.

When each of the other operating mode processors 32 has received a master change notification packet, the operating mode processor 32 decrements, by one, the values of the unit count information and the order information that are stored in the storage unit 35. In addition, the operating mode processor 32 updates the information, including the host name and the IP address, recorded in the storage unit 35 for the master management module 30a.

The operating mode setup unit 33 changes the setup of the operating mode designated to the computer 10. Specifically, when a request for a change to an operating mode for which the power consumption is higher is received from the operating mode processor 32, the operating mode setup unit 33 transmits, to the central processing unit 20, a request for the change to the operating mode for which the power consumption is higher.

Based on the operating condition of the computer 10, the operating mode setup unit 33 determines whether the operating mode should be shifted to an operating mode for which the power consumption is lower. When the operating mode setup unit 33 determines that the operating mode should be shifted, the setup unit 33 transmits, to the central processing unit 20, a request for the change to the operating mode for which the power consumption is lower. An arbitrary process may be employed to determine whether the operating mode should be shifted. For example, the operating mode setup unit 33 may obtain data, such as the number of transactions, from the central processing unit 20 and compare this value with the number of transactions entered in the priority table 351, and when it is determined that the difference between the two values is a predetermined value or greater, may then shift the operating mode.

The network communication unit 34 transmits various packets via the network upon receiving a request from the operating mode processor 32. The network communication unit 34 also transmits, to the operating mode processor 32, various packets received through the network 2.

The master power manager 36 is activated when the corresponding management module 30 serves as the master management module 30a. The master power manager 36 performs various processes to control the operation of the management modules 30 of the individual currently operated computers 10 in the computer group 1.

Specifically, when a start packet is received via the network communication unit 34, the master power manager 36 examines the setup information 352 (information indicating which operating modes are currently designated for the computers 10) that is stored in the storage unit 35, and obtains from the priority table 351 power requirement information corresponding to the operating modes of the individual computers 10. Then, the master power manager 36 determines whether the total value obtained for the obtained power quantities and the consumed power quantities, included in the start packet, is greater than the total providable power quantity that is included in the other information 353 in the storage unit 35.

When the total value is not greater than the total providable power quantity, the master power manager 36 increments, by one, the value of the unit count information included in the other information 353, and transmits the updated value to the packet transmission source as the order in which the computer 10 at the packet transmission source was started. The master power manager 36 then correlates the information, such as the host name and the IP address, specifying the started computer 10 with the operating mode corresponding to the quantity of power consumed, included in the start packet, and designates these data as the setup information 352.

When the total value is greater than the total providable power quantity, the master power manager 36 examines the priority table 351 and the setup information 352, and calculates the total value for the power consumption when the operating mode of the computer 10 at the lowest priority is to be changed to an operating mode for which the power consumption is lower by one level. When the obtained total value is not greater than the total providable power quantity, the master power manager 36 transmits, via the network communication unit 34, a change command packet to the management module 30 of the computer 10 having the lowest priority in order to instruct a change to an operating mode for which the power consumption is lower.

Thereafter, the master power manager 36 increments, by one, the value of the unit count information included in the other information 353, and transmits information designating the order to the management module 30 of the start packet transmission source. The master power manager 36 then designates, for the setup information 352, the host name and the operating mode of the computer 10 that has been started, and updates the operating mode included in the setup information 352 for the computer 10 at the change command packet transmission destination.

When the operating mode of the computer 10 at the lowest priority is changed to the operating mode for which the power consumption is lower by one level, and the total value is still greater than the total providable power quantity, the master power manager 36 calculates the total value when the operating mode of the computer 10 at the second lowest priority is to be changed to the operating mode for which the power consumption is lower by one level. In this manner, until it is determined that the total value is not greater than the total providable power quantity, the master power manager 36 repeats the process performed to determine whether the total value is greater than the total providable power quantity. When it is determined that the total value is not greater than the total providable power quantity, the master power manager 36 transmits, via the network communication unit 34, a change command packet to the management module 30 of the pertinent computer 10 to instruct a change to an operating mode for which the power consumption is lower.

Thereafter, the master power manager 36 increments the value of the unit count information by one, and transmits information designating the order to the management module 30 at the start packet transmission source. The master power manager 36 then designates, as the setup information 352, the host name and the operating mode of the computer 10 that was started, and updates the operating mode that is included in the setup information 352 for the computer 10 at the change command packet transmission destination.

Upon receiving an operating mode change packet, the master power manager 36 of the master management module 30a extracts, from the setup information 352, the information for the current operating mode of the computer 10 at the packet transmission source, and reads, from the priority table 351, the power consumption quantity corresponding to the operating mode. The master power manager 36 then determines whether, when the computer 10 at the packet transmission source is to be shifted to the operating mode for which power consumption is higher by one level, the total quantity of the power consumed by the computer group 1 will become greater than the total providable power quantity stored in the storage unit 35.

When the total value is greater than the total providable power quantity, the master power manager 36 returns an inhibit packet indicating that the operating mode change is disabled.

When the total value is not greater than the total providable power quantity, the master power manager 36 returns a permission packet indicating that the operating mode change is permitted. At this time, the master power manager 36 may examine the priority of the requesting computer 10 and transmit a permission packet.

For example, when the value for the priority of the computer 10 is greater than a predetermined value, the master power manager 36 may transmit the permission packet.

The master power manager 36 broadcasts, for each predetermined time, an existence packet indicating that the master power manager 36 is currently operating. The existence packet includes the unit count information and the setup information that are stored in the storage unit 35.

Figure 5:
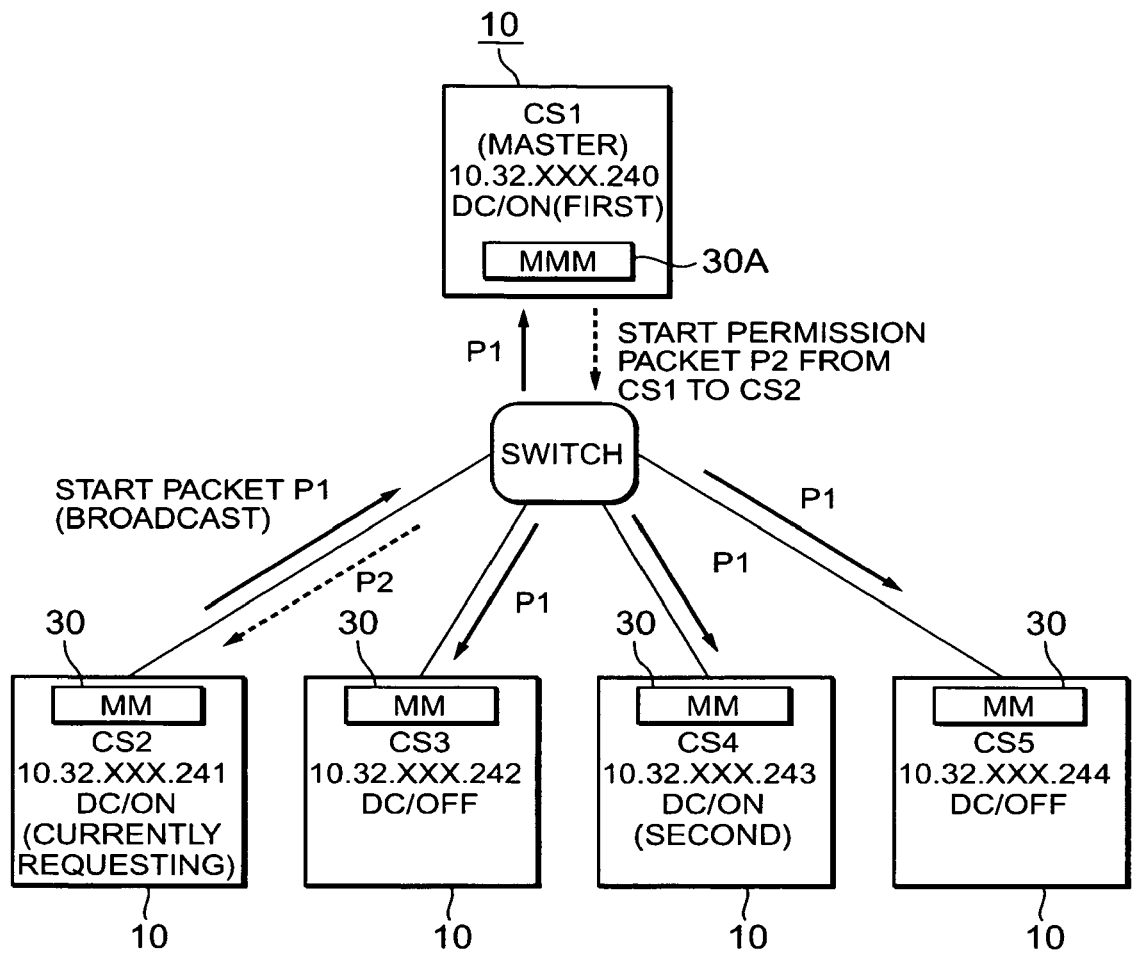
FIG. 5 is a diagram for explaining a relationship between the master management module and the management module when one of the computers is activated.
Figure 6:
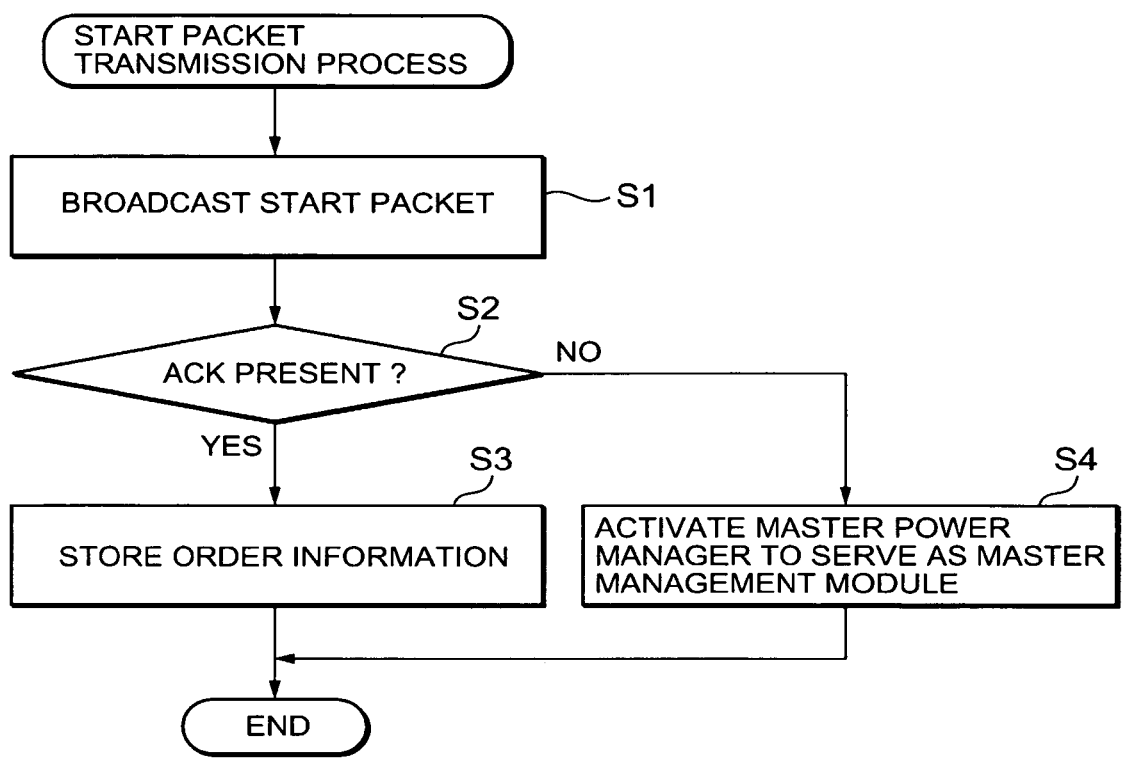
FIG. 6 is a flowchart showing the operation performed to activate one computer.

The operation of the present invention will now be described. FIG. 5 is a diagram for explaining an example relationship between the master management module 30a and the management modules 30 when one computer 10 is activated. FIG. 6 is a flowchart showing the operation performed when one computer 10 is activated.

When the operating mode processor 32 of the management module 30 detects that the DC power source of the corresponding computer 10 has been turned on, the operating mode processor 32 broadcasts, via the network communication unit 34, a start packet that includes information indicating the power quantity required (step S1).

When an ACK for the start packet is returned by the master management module 30a within a predetermined period of time (YES at step S2), the operating mode processor 32 stores order information, together with the ACK, as other information 353 in the storage unit 5 (step S3).

In the state shown in FIG. 5, for example, when one computer 10 (CS2) is activated, the management module 30 of the computer 10 (CS2) broadcasts the start packet. Then, only the master management module 30a of the computer 10 (CS1) transmits a response that the start is permitted. Since the DC power sources of the CS1 and the CS4 have already been switched on, the order position for the CS2 that transmitted the start packet is the third.

When the ACK for the start packet is not returned within a predetermined period of time (NO at step S2), the operating mode processor 32 assumes that the DC power sources of the other computers 10 are off, and activates the master power manager 36. Through this process, the pertinent master module 30 is changed to the master management module 30a (step S4).

Through the processing at steps S1 to S4, the management module 30 of the computer 10 that was activated first serves as the manager management module 30a. The management modules 30 of the computers 10 that were activated second and later receive the start orders from the master management module 30a.

Figure 7:
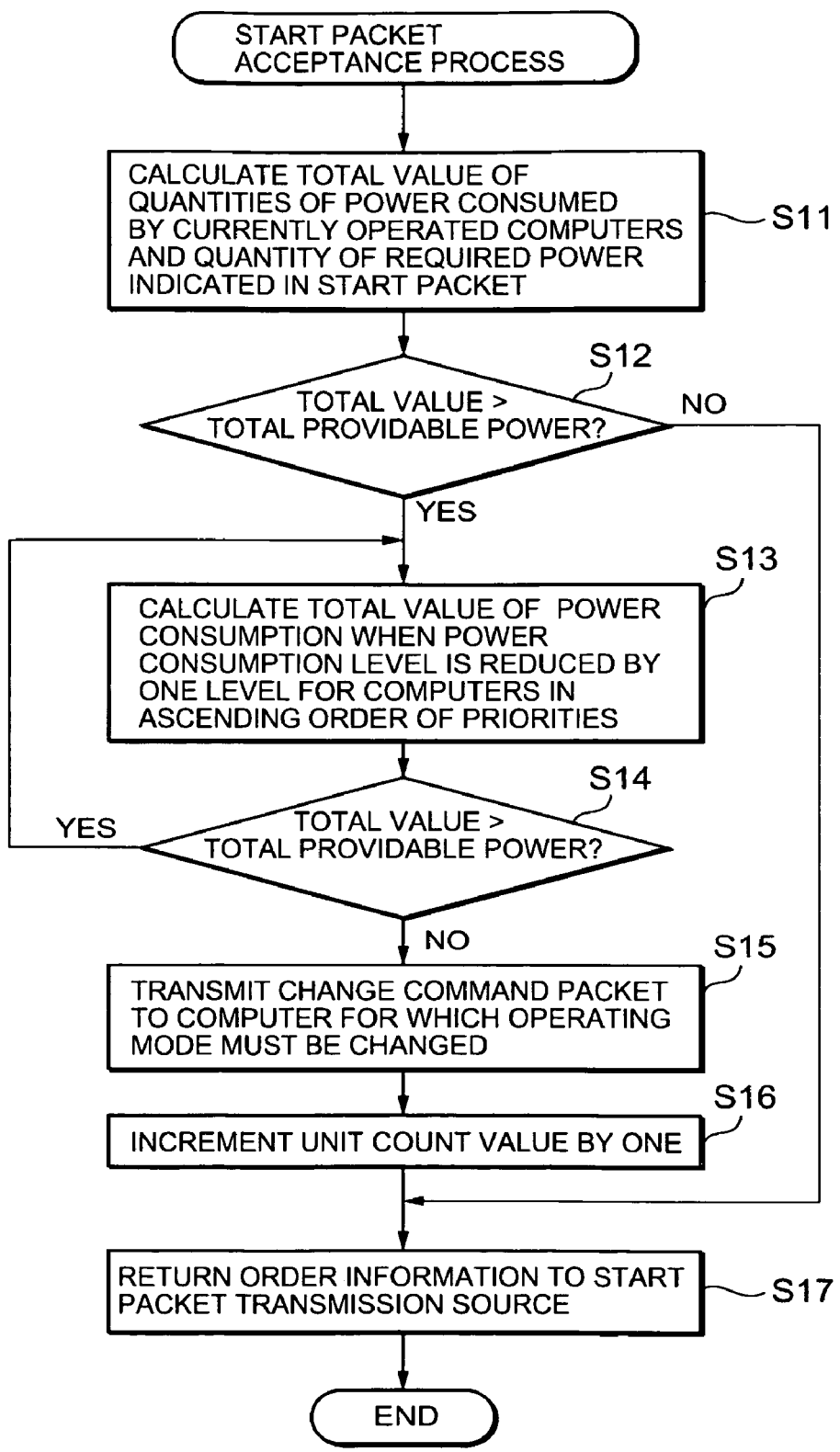
FIG. 7 is a flowchart showing the performance of the operation whereby the master management module accepts a start packet.

FIG. 7 is a flowchart showing the operation wherein the master management module 30a accepts a start packet.

Upon receiving a start packet, the master power manager 36 of the master management module 30a calculates the total value of the quantities of the power consumed by the individual computers 10 that are currently being operated and the quantity of the consumed power indicated by the start packet (step S11). Then, the master power manager 36 determines whether the total value is greater than the total providable power quantity (step S12).

When the total value is greater than the total providable power quantity (YES at step S12), the master power manager 36 calculates the total value of the power that will be consumed when the operating mode of the computer 10 at the lowest priority is changed to a mode for which the power consumption is lower by one level (step S13). Then, the master power manager 36 determines whether the total value is greater than the total providable power quantity (step S14).

When the total value is greater (YES at step S14), the master power manager 36 returns to step S13 and calculates the total value of the power that will be consumed when the operating mode of the computer 10 at the second lowest priority is changed to the mode for which the power consumption is lower by one level.

When the total value is not greater than the total providable power quantity at step S14 (NO at step S14), the master power manager 36 transmits, to the computers 10 for which the operating modes must be changed, i.e., to the computers 10 for which the operating modes were supposed to be lowered by one level during the calculation of the total value of power consumption, a change command packet designating the instruction for a change to an operating mode for which the power consumption is lower (step S15). Following this, the master power manager 36 increments, by one, the value of the unit count information included in the other information 353 (step S16). Thereafter, the master power manager 36 transmits to the computer 10 at the start packet transmission source information indicating the activation order (the value of the unit count information after being incremented) (step S17).

When the total value is not greater than the total providable power quantity at step 12 (NO at step S12), the master power manager 36 performs the process at step S17.

Through the processing at steps S11 to S17, before a specific computer 10 is started, the total quantity of the power consumed by all the computers 10, including the specific computer 10, can be controlled so as not to be greater than the total providable power quantity.

Figure 8:
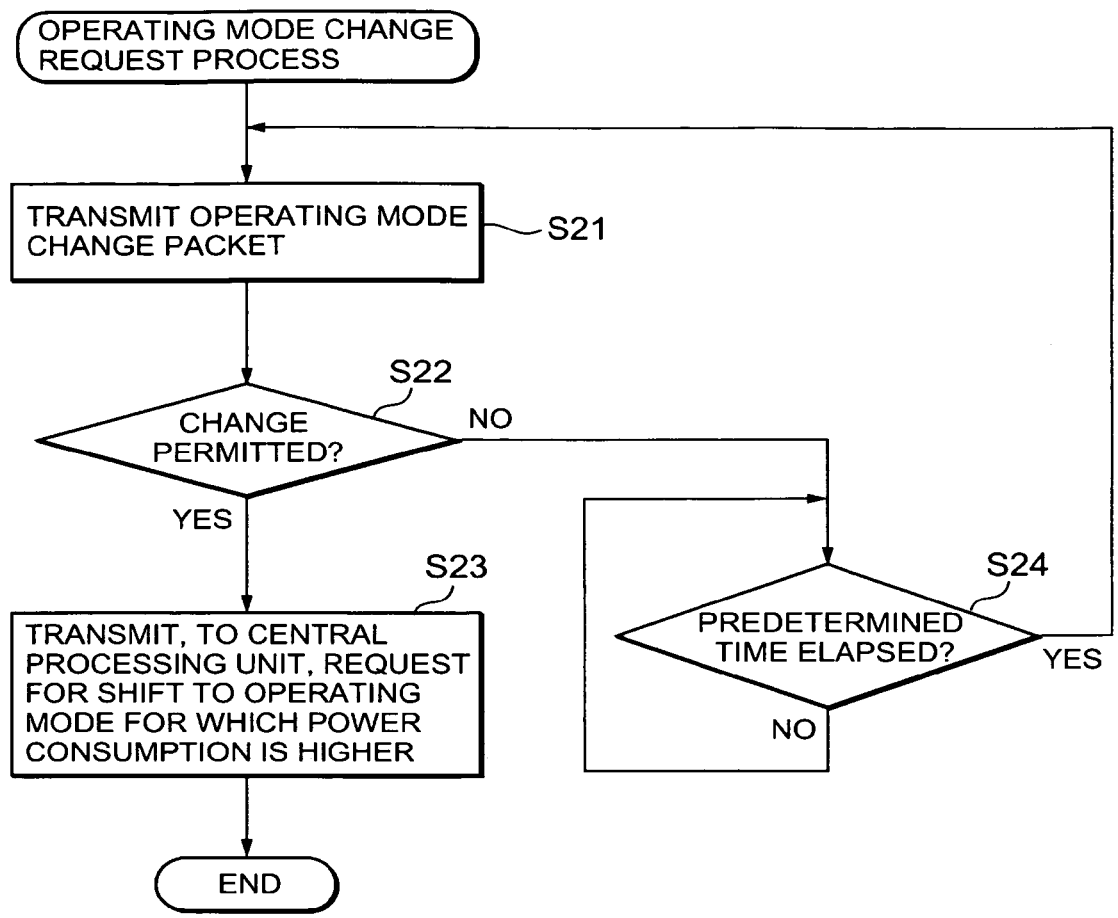
FIG. 8 is a flowchart showing the performance of the operation whereby the management module requests a change to an operating mode for which a large power consumption is required.

FIG. 8 is a flowchart showing the operation performed when the management module 30 issues an operating mode change request for a change to an operating mode for which the power consumption is higher.

The operating mode processor 32 of the management module 30 examines the operating conditions, such as the number of transactions, of the corresponding computer 10 for each predetermined time, for example. And as needed, the operating mode processor 32 transmits to the master management module 30a, via the network communication unit 34, an operating mode change packet for the consumption of more power (step S21).

The operating mode processor 32 then determines whether a response to the operating mode change packet represents permission for the change (step S22). When the response represents permission for the change (YES at step S22), the operating mode processor 32 requests that the operating mode setup unit 33 change the operating mode. For this, the operating mode setup unit 33 transmits to the central processing unit 20 a request for a shift to an operating mode that consumes greater power (step S23).

When the response to the operating mode change packet indicates that the change is inhibited (NO at step S22), the operating mode processor 32 employs an internal timer and waits until a predetermined time period has elapsed (NO at step S24). After the predetermined time period has elapsed (YES at step S24), the operating mode processor 32 returns to step S21 and retransmits the operating mode change request.

Figure 9:
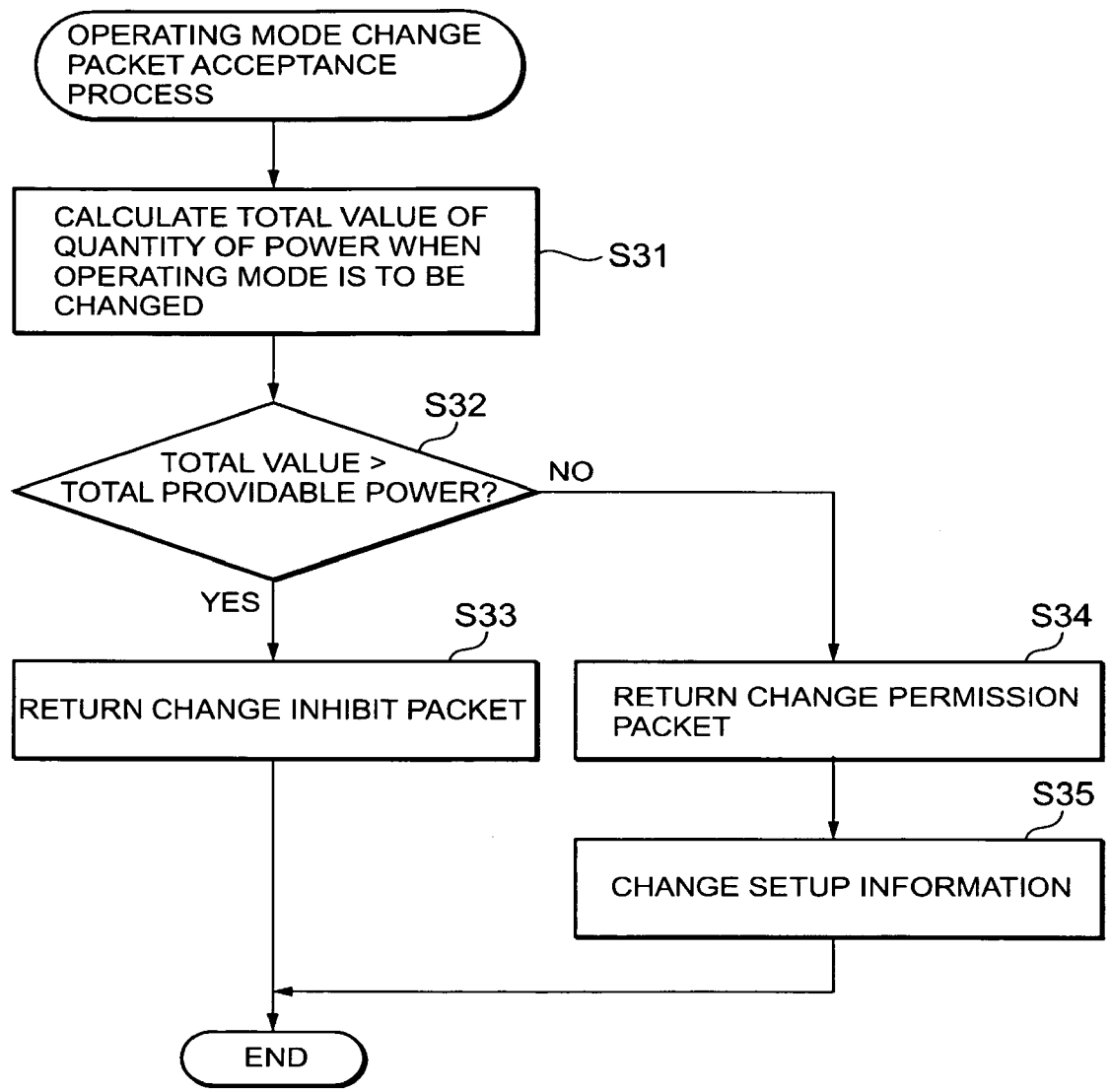
FIG. 9 is a flowchart showing the performance of the operation whereby the master management module receives an operation change packet.

FIG. 9 is a flowchart showing the operation performed when the master management module 30a receives an operating mode change packet.

Upon receiving the operating mode change packet, the master power manager 36 calculates the total value of the power that will be consumed by the computer group 1 when the operating mode change is permitted. That is, the master power manager 36 calculates the total value of the quantity of the power consumed that is specified by the operating mode change packet and the quantities of the power consumed by the computers 10, other than the computer 10 for which the change is requested, that are currently being operated (step S31). Then, the master power manager 36 determines whether the total value is greater than the total providable power quantity (step S32).

When the total value is greater than the total providable power quantity (YES at step S32), the master power manager 36 returns a packet indicating the change is inhibited (step S33). On the other hand, when the total value is not greater than the total providable power quantity (NO at step S32), the master power manager 36 returns a packet indicating the change is permitted (step S34), and changes the setup information 352 (step S35).

Figure 10:
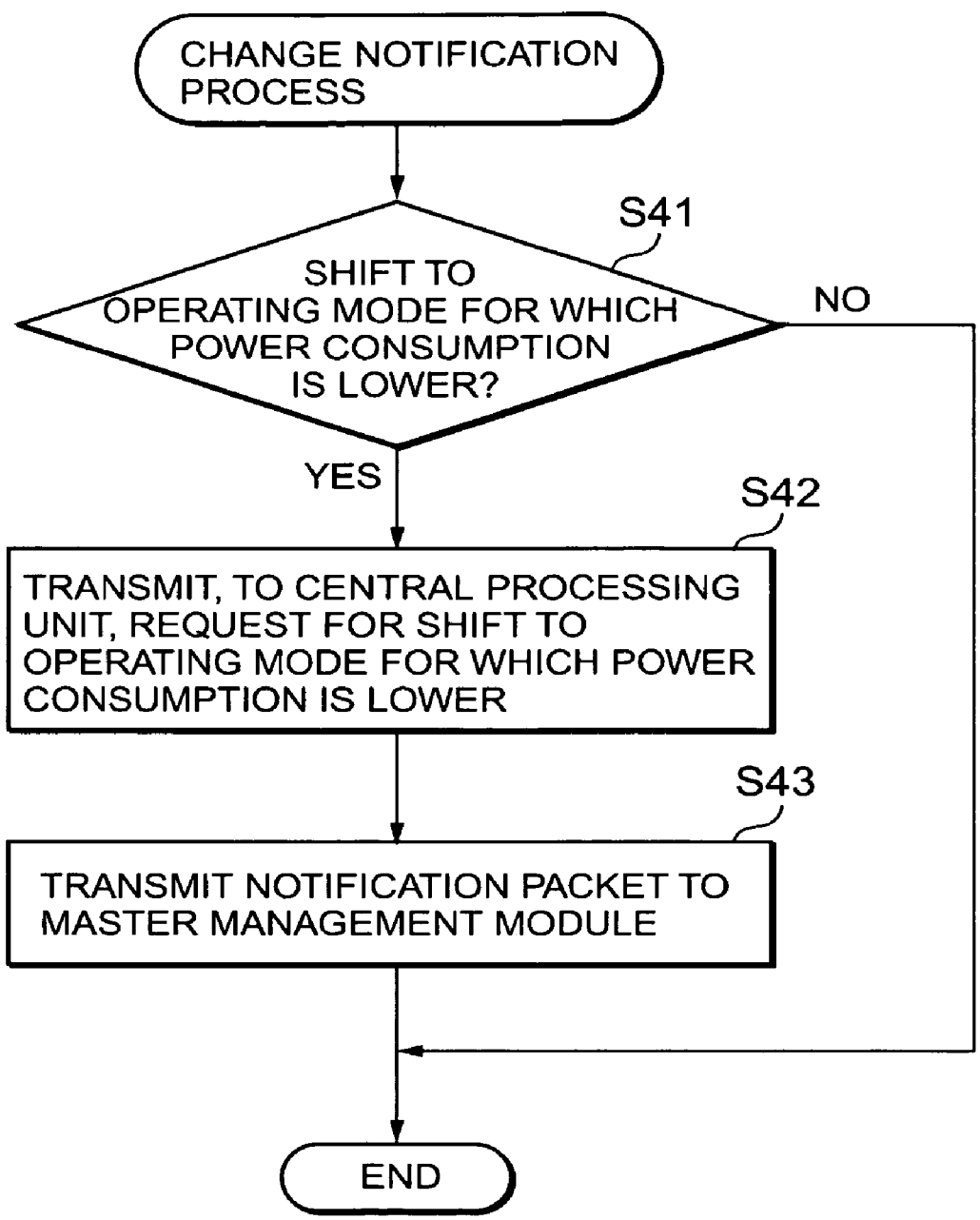
FIG. 10 is a flowchart showing the performance of the operation whereby the management module issues a notification that a change to an operating mode for which a small power consumption is required has been completed.

FIG. 10 is a flowchart showing the operation performed to transmit a notification that the management module 30 has changed to the operating mode for which the power consumption is smaller.

The operating mode processor 32 of the management module 30 examines the operating condition, including data such as the number of transactions, of the corresponding computer 10 for each predetermined period of time, for example. Then, the operating mode processor 32 determines whether the operating mode is to be shifted to an operating mode for which the power consumption is lower (step S41). When it is determined that the operating mode is not to be shifted (NO at step S41), the processing is terminated.

When it is determined that the operating mode should be shifted (YES at step S41), the operating mode processor 32 transmits to the central processing unit 20, via the operating mode setup unit 33, a request for a change to an operating mode for which the power consumption is lower (step S42). The operating mode processor 32 transmits to the master management module 30a, via the network communication unit 34, a notification packet that includes information concerning the quantity of power required following the operating mode change, (step S43). Upon receiving the notification packet, the master power manager 36 of the master management module 30a changes the setup information 352.

Figure 11:
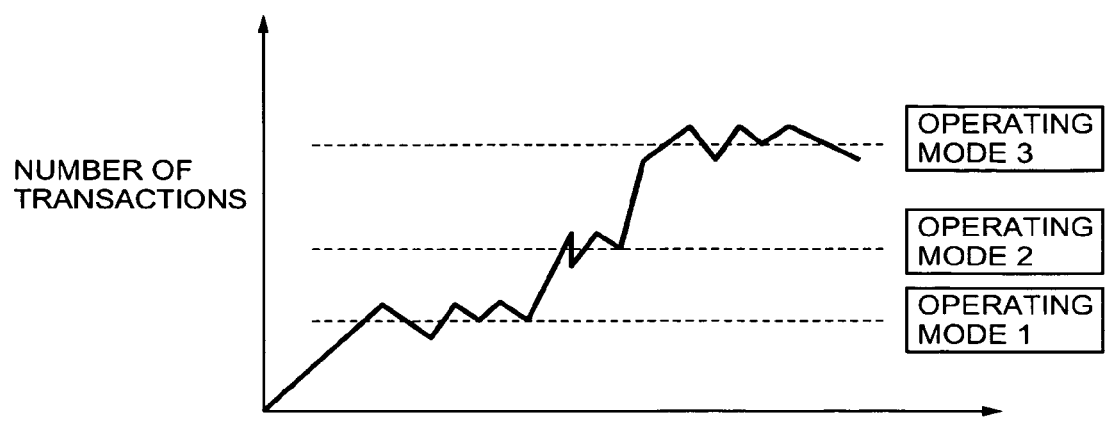
FIG. 11 is a graph showing an example shifting of the operating mode of a computer.

Through the above described processing performed to change operating modes, the operating modes of the individual computers 10 can be changed, and the quantities of the power consumed by the computers 10 can be optimized. An example wherein the operating mode of a computer 10 is shifted is shown in FIG. 11.

The present invention can be variously modified or applied. For example, instead of the information indicating the quantity of power to be consumed, information indicating the operating mode may be included in the operating mode change request packet or in the notification packet. In such a case, the master power manager 36 examines the priority table 351 to determine which power requirement corresponds to the operating mode indicated in the received packet.

The present invention can be provided not only by employing a special system, but also by executing an ordinary computer program. For example, a program for the above described operation can be distributed by storing it on a computer-readable recording medium, such as an FD, a CD-ROM or a DVD, and when this program is installed in a computer, the above processing can be performed. Furthermore, a program may be stored on the disk drive of a server on a network, such as the Internet, and may be downloaded to a computer.

Further, when the above described functions are shared with an OS, or are provided by both an OS and an application, only the part, other than the OS, may be distributed by storing it on a recording medium, or it may be downloaded to a computer.

While the present invention has been described in connection with a certain exemplary embodiment, it must be understood that the subject matter encompassed by the present invention is not limited to the cited embodiment. On the contrary, it is intended that all alternatives, modifications and equivalents within the spirit and the scope of the following claims be included.

Further, it is the inventor's intent to reform all equivalents of the claimed invention even if the claims are amended during prosecution.

What is claimed is:

1. A power management apparatus, for managing the quantity of power that is consumed by a computer group including a plurality of computers interconnected by a network, comprising:

controllers, provided for the computers, for respectively obtaining a quantity of power consumed by each of the computers in the computer group;

storage units, provided for the computers, for storing a maximum quantity of power to be supplied to the computer group; and an overall controller for obtaining, from the controllers of the computers, the quantities of power consumed by the computers and for adjusting power consumption so that a total value of a power consumed by the computer group is not greater than the maximum quantity of power, wherein the overall controller is activated by one computer in the computer group, wherein, operating mode information, indicating a plurality of operating modes corresponding to power consumption for the computers, and setup information, indicating operating modes currently set for the computers, are also stored in the storage units, and wherein, based on the operating mode information and the setup information, the overall controller adjusts the total quantity of power consumed by the computer group so as not to exceed the maximum quantity of power, wherein the operating mode information stored in the storage units includes data for the maximum power consumption and for a number of transactions for each of the operating modes for each of the computers, and wherein each of the controllers includes:

a unit for obtaining from the corresponding computer, for each predetermined time, information concerning the number of transactions;

a determination unit for examining the operating mode information to obtain the number of transactions that corresponds to an operating mode currently set for the corresponding computer, for comparing the number of transactions with the number of transactions obtained from the operating mode information, and for determining whether the operating mode currently set for the corresponding computer is appropriate and a unit for employing the determination results obtained by the determination unit to transmit an operating mode change request to the overall controller.

2. A power management apparatus according to claim 1, wherein priorities, for the computers, that are related to the supply of power are also stored in the storage units; and wherein, based on the priorities, the overall controller adjusts the total quantity of power consumed by the computer group so as not to exceed the maximum quantity of power.

3. The power management apparatus according to claim 1, wherein each of the controllers further includes a unit for transmitting, to the overall controller, a power supply request that includes information for the quantity of power required for the corresponding computer; and wherein the overall controller calculates a total value for the quantity of power consumed by the computer group when the quantity of power included in the power supply request is to be consumed, and when the total value is not greater than the maximum quantity of power, transmits a notification to the controller to permit the supply of a requested quantity of power.

4. The power management apparatus according to claim 1, wherein the overall controller includes a unit for receiving predetermined communication data from a specific controller and for returning response data to the controller; and wherein the specific controller transmits the predetermined communication data to the other computers and when the specific controller does not receive data in response to the transmission of the predetermined communication data, the specific controller activates the overall controller in a corresponding computer.

5. A power management apparatus, for managing the quantity of power that is consumed by a computer group including a plurality of computers interconnected by a network, comprising:

controllers, provided for the computers, for respectively obtaining a quantity of power consumed by each of the computers in the computer group;

storage units, provided for the computers, for storing a maximum quantity of power to be supplied to the computer group; and an overall controller for obtaining, from the controllers of the computers, the quantities of power consumed by the computers and for adjusting power consumption so that a total value of a power consumed by the computer group is not greater than the maximum quantity of power, wherein the overall controller is activated by one computer in the computer group, wherein start information, indicating a computer for which a new overall controller is to be activated when the currently operated overall controller is disabled, is also stored in the storage units;

wherein the overall controller further includes a unit for transmitting predetermined communication data to the controllers of the computers each predetermined period of time;

wherein, when the predetermined communication data are not received from the overall controller within the predetermined period of time, each of the controllers examines the start information in the corresponding storage unit to determine whether a corresponding computer comprises an appropriate computer wherein a new overall controller can be activated; and wherein, when the corresponding computer comprises the appropriate computer, the new overall controller is activated in the corresponding computer.

6. A power management method, for managing a quantity of power that is consumed by a computer group including a plurality of computers interconnected by a network, said method comprising:

obtaining a respective quantity of power consumed by each of the computers;

storing a maximum quantity of power to be supplied to the computer group; and obtaining the quantities of the power consumed by the computers and providing overall control for the power consumption, so that the total value of the quantity of power consumed by the computer group is not greater than the maximum quantity of power, whereby the overall control is activated by only one computer in the computer group, wherein, operating mode information, indicating a plurality of operating modes corresponding to power consumption for the computers, and setup information, indicating operating modes currently set for the computers, are also stored, and wherein, based on the operating mode information and the setup information, the overall control adjusts the total quantity of power consumed by the computer group so as not to exceed the maximum quantity of power;

wherein the operating mode information includes data for the maximum power consumption and for a number of transactions for each of the operating modes for each of the computers; and wherein the obtaining of said respective quantity of power includes:

obtaining from the corresponding computer, for each predetermined time, information concerning the number of transactions;

examining the operating mode information to obtain the number of transactions that corresponds to an operating mode currently set for the corresponding computer, for comparing the number of transactions with the number of transactions obtained from the operating mode information, and for determining whether the operating mode currently set for the corresponding computer is appropriate; and employing the determining results to transmit an operating mode change request to the overall control.

7. A power management method, for managing a quantity of power that is consumed by a computer group including a plurality of computers interconnected by a network, said method comprising:

obtaining a respective quantity of power consumed by each of the computers;

storing a maximum quantity of power to be supplied to the computer group; and obtaining the quantities of the power consumed by the computers and providing overall control for the power consumption, so that the total value of the quantity of power consumed by the computer group is not greater than the maximum quantity of power, whereby the overall control is activated by only one computer in the computer group, wherein start information, indicating a computer for which a new overall control is to be activated when the currently operated overall control is disabled, is also stored in the storing, wherein the overall control further includes transmitting predetermined communication data to the control the computers each predetermined period of time, wherein, when the predetermined communication data are not received from the overall control within the predetermined period of time, each control examines the start information in the corresponding storing to determine whether a corresponding computer comprises an appropriate computer wherein a new overall control can be activated, and wherein, when the corresponding computer comprises the appropriate computer, the new overall control is activated in the corresponding computer.

8. A computer readable recording medium tangibly embodying a program of machine-readable instructions executable by a digital processing apparatus that permits a computer to function as:

a controller, provided for a plurality of computers that are interconnected by a network, thereby constituting a computer group, for obtaining a respective quantity of power consumed by each of the computers;

storage units, which are provided for the computers and which can store a maximum quantity of power to be supplied to the computer group;

an overall controller, for obtaining the quantities of power consumed by the computers from the controllers of the computers and for controlling power consumption so that a total value of the quantity of power consumed by the computer group is not greater than the maximum quantity of power; and a unit for permitting only one computer in the computer group to activate the overall controller, wherein, operating mode information, indicating a plurality of operating modes corresponding to power consumption for the computers, and setup information, indicating operating modes currently set for the computers, are also stored in the storage units; and wherein, based on the operating mode information and the setup information, the overall controller adjusts the total quantity of power consumed by the computer group so as not to exceed the maximum quantity of power, wherein the operating mode information stored in the storage units includes data for the maximum power consumption and for a number of transactions for each of the operating modes for each of the computers, and wherein each of the controllers includes:

a unit for obtaining from the corresponding computer, for each predetermined time, information concerning the number of transactions;

a determination unit for examining the operating mode information to obtain the number of transactions that corresponds to an operating mode currently set for the corresponding computer, for comparing the number of transactions with the number of transactions obtained from the operating mode information, and for determining whether the operating mode currently set for the corresponding computer is appropriate; and a unit for employing the determination results obtained by the determination unit to transmit an operating mode change request to the overall controller.

9. A computer readable recording medium tangibly embodying a program of machine-readable instructions executable by a digital processing apparatus that permits a computer to function as:

a controller, provided for a plurality of computers that are interconnected by a network, thereby constituting a computer group, for obtaining a respective quantity of power consumed by each of the computers;

storage units, which are provided for the computers and which can store a maximum quantity of power to be supplied to the computer group;

an overall controller, for obtaining the quantities of power consumed by the computers from the controllers of the computers and for controlling power consumption so that a total value of the quantity of power consumed by the computer group is not greater than the maximum quantity of power; and a unit for permitting only one computer in the computer group to activate the overall controller, wherein start information, indicating a computer for which a new overall controller is to be activated when the currently operated overall controller is disabled, is also stored in the storage units;

wherein the overall controller further includes a unit for transmitting predetermined communication data to the controllers of the computers each predetermined period of time;

wherein, when the predetermined communication data are not received from the overall controller within the predetermined period of time, each of the controllers examines the start information in the corresponding storage unit to determine whether a corresponding computer comprises an appropriate computer wherein a new overall controller can be activated; and wherein, when the corresponding computer comprises the appropriate computer, the new overall controller is activated in the corresponding computer.

10. A power management apparatus, for managing the quantity of power that is consumed by a computer group including a plurality of computers interconnected by a network the apparatus, the apparatus comprising:

means for controlling, provided for the computers, for respectively obtaining a quantity of power consumed by each of the computers in the computer group;

means for storaging, provided for the computers, for storing a maximum quantity of power to be supplied to the computer group; and means for overall controlling for obtaining, from the controllers of the computers, the quantities of power consumed by the computers and for adjusting power consumption so that a total value of a power consumed by the computer group is not greater than the maximum quantity of power, wherein the means for overall control is activated by one computer in the computer group, wherein, operating mode information, indicating a plurality of operating modes corresponding to power consumption for the computers, and setup information, indicating operating modes currently set for the computers, are also stored in the means for storaging, and wherein, based on the operating mode information and the setup information, the means for overall controlling adjusts the total quantity of power consumed by the computer group so as not to exceed the maximum quantity of power, wherein the operating mode information stored in the means for storaging includes data for the maximum power consumption and for a number of transactions for each of the operating modes for each of the computers, and wherein each of the means for controlling includes:
- a unit for obtaining from the corresponding computer, for each predetermined time, information concerning the number of transactions;
- a determination unit for examining the operating mode information to obtain the number of transactions that corresponds to an operating mode currently set for the corresponding computer, for comparing the number of transactions with the number of transactions obtained from the operating mode information, and for determining whether the operating mode currently set for the corresponding computer is appropriate; and
- a unit for employing the determination results obtained by the determination unit to transmit an operating mode change request to the means for overall controlling.

11. A power management apparatus, for managing the quantity of power that is consumed by a computer group including a plurality of computers interconnected by a network, said apparatus comprising:

means for controlling, provided for the computers, for respectively obtaining a quantity of power consumed by each of the computers in the computer group;

means for storaging, provided for the computers, for storing a maximum quantity of power to be supplied to the computer group; and means for overall controlling for obtaining, from the means for controlling of the computers, the quantities of power consumed by the computers and for adjusting power consumption so that a total value of a power consumed by the computer group is not greater than the maximum quantity of power, wherein the means for overall controlling is activated by one computer in the computer group, wherein start information, indicating a computer for which a new means for overall controlling is to be activated when the currently operated means for overall controlling is disabled, is also stored in the means for storaging, wherein the means for overall controlling further includes a unit for transmitting predetermined communication data to the means for controlling of the computers each predetermined period of time, wherein, when the predetermined communication data are not received from the means for overall controlling within the predetermined period of time, each of the means for controlling examines the start information in the corresponding means of storaging to determine whether a corresponding computer comprises an appropriate computer wherein a new means for overall controlling can be activated, and wherein, when the corresponding computer comprises the appropriate computer, the new means for overall controlling is activated in the corresponding computer.

* * * * *